(12) United States Patent
Suh et al.

(10) Patent No.: US 9,326,136 B2
(45) Date of Patent: Apr. 26, 2016

(54) METHOD AND APPARATUS FOR MANAGING GROUP KEY FOR MOBILE DEVICE

(75) Inventors: Kyung-Joo Suh, Seoul (KR); Young-Hoon Park, Seoul (KR); Seung-Woo Seo, Seoul (KR); Dong-Hyun Je, Seoul (KR); Beom-Sik Bae, Suwon-si (KR); Young-Kyo Baek, Seoul (KR); Sung-Ho Choi, Suwon-si (KR); Sang-Soo Jeong, Suwon-si (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 154 days.

(21) Appl. No.: 14/130,829

(22) PCT Filed: Jul. 4, 2012

(86) PCT No.: PCT/KR2012/005312
§ 371 (c)(1),
(2), (4) Date: Jan. 3, 2014

(87) PCT Pub. No.: WO2013/005989
PCT Pub. Date: Jan. 10, 2013

(65) Prior Publication Data
US 2014/0149745 A1     May 29, 2014

(30) Foreign Application Priority Data

Jul. 4, 2011    (KR) .................. 10-2011-0066137

(51) Int. Cl.
*H04W 12/04*        (2009.01)
*H04L 9/08*         (2006.01)
(Continued)

(52) U.S. Cl.
CPC ............. *H04W 12/04* (2013.01); *H04L 9/0833* (2013.01); *H04L 9/0891* (2013.01); *H04L 9/3073* (2013.01); *H04L 63/065* (2013.01); *H04L 63/068* (2013.01); *H04L 2209/80* (2013.01)

(58) Field of Classification Search
CPC ..... H04L 9/0833; H04L 63/10; H04L 63/065; H04L 63/104
USPC ........ 726/2–4, 26, 27; 713/163; 380/183, 184
See application file for complete search history.

(56) References Cited

U.S. PATENT DOCUMENTS

| | | | |
|---|---|---|---|
| 2002/0154782 A1 | 10/2002 | Chow et al. | |
| 2004/0044891 A1 | 3/2004 | Hanzlik et al. | |
| 2005/0050004 A1* | 3/2005 | Sheu | H04L 9/083 |

(Continued)

FOREIGN PATENT DOCUMENTS

| | | |
|---|---|---|
| CN | 101645870 A | 2/2010 |
| CN | 102164125 A | 8/2011 |

(Continued)

OTHER PUBLICATIONS

Mukherjee et al., Scalable Solutions for Secure Group Communications, Computer Networks 51, Feb. 2007, pp. 3525-3548, Elsevier B.V.

(Continued)

*Primary Examiner* — Joseph P Hirl
*Assistant Examiner* — Kalish Bell
(74) *Attorney, Agent, or Firm* — Jefferson IP Law, LLP

(57) ABSTRACT

Provided is a method for managing a group key in a key distribution center. The method includes: receiving a key request from a mobile device; generating a private key for the mobile device using information about a withdrawal time included in the key request; generating a public key and a verification key for the mobile device; and transmitting at least one key including the generated key to the mobile device.

18 Claims, 8 Drawing Sheets

(51) Int. Cl.
*H04L 29/06* (2006.01)
*H04L 9/30* (2006.01)

(56) References Cited

U.S. PATENT DOCUMENTS

| | | |
|---|---|---|
| 2005/0144439 A1 | 6/2005 | Park et al. |
| 2007/0019807 A1 | 1/2007 | Jung |
| 2007/0143600 A1* | 6/2007 | Kellil .............. H04L 9/0822 713/163 |
| 2008/0010242 A1* | 1/2008 | Jin ................... G06F 21/445 |
| 2009/0214043 A1 | 8/2009 | Choi et al. |
| 2009/0254750 A1 | 10/2009 | Bono et al. |

FOREIGN PATENT DOCUMENTS

| | | |
|---|---|---|
| KR | 10-2004-0105064 A | 12/2004 |
| KR | 10-2009-0092509 A | 9/2009 |

OTHER PUBLICATIONS

Waldvogel et al., The VersaKey Framework: Versatile Group Key Management, IEEE Journal on Selected Areas in Communications, Sep. 1999, pp. 1614-1631, vol. 17, No. 9, IEEE, Piscataway, NJ, USA.

* cited by examiner

METHOD AND APPARATUS FOR MANAGING GROUP KEY FOR MOBILE DEVICE

BACKGROUND OF THE INVENTION

1. Field of the Invention

The present invention relates to group key management, and in particular, to a method and apparatus for effectively updating a group key in a group including mobile devices.

2. Description of the Related Art

In an environment where there are a plurality of device groups, what is the most important thing among security issues in communication between devices is to prevent a device that does not belong to a group from acting as a member of the group and receiving a multicast message which is transmitted only to devices which belong to the group.

In order to reduce the burden in operation and communication of a server, a multicast message transmitted to a group is encrypted with a group key. In addition, when a user of the group is changed, the group key should be updated in order to prevent the user from viewing the multicast message before subscribing to the group or after withdrawing from the group.

A fixed device directly receives an updated group key from a predetermined key distribution center or a base station.

However, when a device is moveable, not only the device should receive a group key in a wireless manner but also a base station for transmitting the group key may be changed in each case. Therefore, security for the group key may be insufficient. In addition, there is a problem that a mobile device is not able to receive a group key when a communicable base station is not located near the mobile device.

SUMMARY OF THE INVENTION

Objects of the present invention are to substantially solve at least the above problems and/or disadvantages and to provide at least the advantages below. Accordingly, an object of the present invention is to provide a method and apparatus for managing a group key for a mobile device.

Another object of the present invention is to provide a method and apparatus for safely transmitting a group key required for multicast in a mobile device.

Another object of the present invention is to provide a method and apparatus for safely transmitting an updated group key to a mobile device in a base station.

According to an aspect of the present invention, a method for managing a group key in a key distribution center includes: receiving a key request from a mobile device; generating a private key for the mobile device using information about a withdrawal time included in the key request; generating a public key and a verification key for the mobile device; and transmitting at least one key including the generated key to the mobile device.

According to another aspect of the present invention, a key distribution center (KDC) apparatus for managing a group key includes: a control unit for generating a private key for a mobile device using information about a withdrawal time included in a key request at a time of a key request from the mobile device and generating a public key and a verification key for the mobile device; and a modem for receiving a group key request from the mobile device and transmitting at least one key including the generated key to the mobile device.

According to another aspect of the present invention, a method for managing a key in a mobile device includes: transmitting a first verification message to a counterpart mobile device and receiving a second verification message from the counterpart mobile device; verifying whether the second verification message is valid; generating a session key when the second verification message is valid; encrypting its own group key using the session key when a version of a group key included in the second verification message is not later than a version of its own group key; and transmitting the encrypted group key to the counterpart mobile device.

According to another aspect of the present invention, a mobile device apparatus for managing a key includes: a control unit for generating a first verification message to be transmitted to a counterpart mobile device, verifying whether a second verification message received from the counterpart mobile device is valid, generating a session key when the second verification message is valid, and encrypting its own group key using the session key when a version of a group key included in the second verification message is not later than a version of its own group key; and a modem for transmitting the first verification message to the counterpart mobile device, receiving the second verification message from the counterpart mobile device and transmitting the encrypted group key to the counterpart mobile device.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Exemplary embodiments of the present invention will be described herein below with reference to the accompanying drawings. In the following description, detailed descriptions of well-known functions or configurations will be omitted since they would unnecessarily obscure the subject matters of the present invention. Also, the terms used herein are defined according to the functions of the present invention. Thus, the terms may vary depending on users' or operators' intentions or practices. Therefore, the terms used herein should be understood based on the descriptions made herein.

The present invention provides a method and apparatus for managing a group key for mobile devices.

The present invention includes a Group Controller (GC) or Key Distribution Center (KDC) for managing a key to be encrypted for safe multicast between mobile devices, a base station, and a mobile device.

Figure 1:
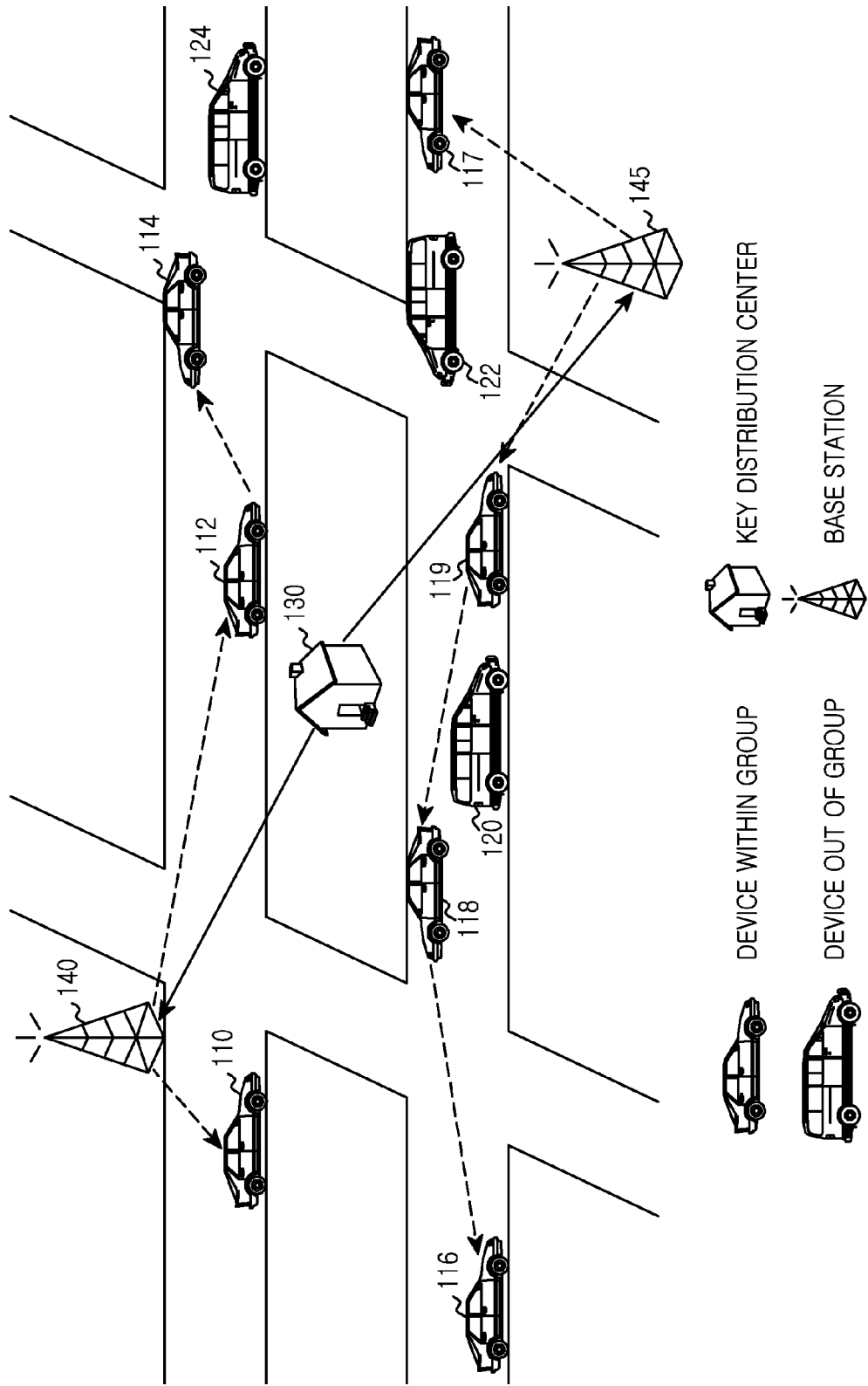
FIG. 1 is a diagram illustrating scenarios for group key delivery according to embodiments of the present invention.

FIG. 1 is a diagram illustrating scenarios for group key delivery according to embodiments of the present invention.

Referring to FIG. 1, a system includes a plurality of mobile devices 110, 112, 114, 116, 117, 118 and 119 which belong to a group, a plurality of mobile devices 120, 122 and 124 which do not belong to the group, and a key distribution center 130, and a plurality of base stations 140 and 145.

In FIG. 1, a vehicle is shown as an example of the mobile device. However, this is merely an example for convenience and therefore, a portable terminal may be given as an example and examples thereof are not limited thereto.

The key distribution center 130 may communicate with the plurality of base stations 140 and 145 through backhaul. In addition, communication between the mobile devices and communication between the mobile device and the base station may be implemented using wireless communication.

When the mobile device subscribes to or withdraws from a group, the key distribution center 130 updates the group key and transmits the updated group key to the plurality of base stations 140 and 145.

Thereafter, each base station encrypts the updated group key and transmits the encrypted group key to mobile devices within the communication coverage of the base station.

In addition, when a mobile device outside the coverage of the base station attempts to receive the group key, the mobile device moves to around the base station and then receives the group key, or receives the group key from another mobile device that has received the group key.

Symbols used for the present invention are given as follows.

p: very large prime number $G_1, G_2, G_T$: multiplicative cyclic groups of prime order p. That is, the definition is given as the follows.

When $G_1$ is $G_1=\{Z_1, Z_2, \ldots, Z_{p-1}\}$ and there is $Z_k$ satisfying $Z_k \in G_1$, $G_1$ is a set $G_1=\{Z_k^0, Z_k^1, Z_k^2, \ldots, Z_k^{p-2}\}$. Herein, the superscripts denote a power and are calculated as remainders resulting from division by prime order p. In this manner, $G_2$, and $G_T$ are defined. For example, $\{1,2,3,4,5,6\}$ is the multiplicative cyclic group of prime order 7. The reason for this is that, since $3^0=1$, $3^1=3$, $3^2=9=2$, $3^3=27=6$, $3^4=81=4$, $3^5=243=5$ (remainders resulting from division by 7), $\{1,2,3,4,5,6\}=\{3^0, 3^1, 3^2, 3^3, 3^4, 3^5\}$. P and $G_1$, $G_2$ and $G_T$ are a prime number and sets used for a verification algorithm.

These values should be known to the key distribution center, the base station and mobile devices subscribing to a group, and are invariant in any cases.

$g_1 \in G_1$ and $g_2 \in G_2$ are generators and integers, which are basic values used to generate all variables for the present invention. That is, with respect to an integer k, keys are expressed in the form of $g_1^k$ and $g_2^k$. $g_1^0, g_1^0, g_1^0, \ldots, g_1^{p-1}$ should be different from each other, and $g_2^0, g_2^0, g_2^0, \ldots, g_2^{p-1}$ should be also different from each other. In this case, the superscripts denote a power and the generators should be known to the key distribution center, the base station and mobile devices subscribing to a group, and are invariant in any cases. The generators are distributed to all devices within the group with the same value.

$d_A$ and $d_B$ are the private keys of Alice and Bob and integers, which are generated by the key distribution center and transmitted to a mobile device. The private keys are known only to the mobile device and the key distribution center. In this case, $\gcd(d_A, p-1)=\gcd(d_B, p-1)=1$, $d_A \neq 1$, $d_B \neq 1$ are required. When $\gcd(d_A, p-1) \neq 1$, an integer $d'_A$ satisfying $d_A \neq d'_A$ and $g_2^{d_A}=g_2^{d'_A}$ exists. In actually, there are additional integers $d'_A$ satisfying $g_2^{d_A}=g_2^{d'_A}$, the number of which is $\gcd(d_A, p-1)-1$. $g_2^{d_A}$ is a public value, but $d_A$ is a private value known only to Alice. As described above, since the number of values used as $d_A$ is $\gcd(d_A, p-1)$, a probability of finding $d_A$ from $g_2^{d_A}$ increases from $$\frac{1}{p-1}$$

to $$\frac{\gcd(d_A, p-1)}{p-1}.$$

That is, since security of $d_A$ is reduced $$\frac{1}{\gcd(d_A, p-1)}$$

times, $\gcd(d_A, p-1)=1$ should be satisfied.

$e_A$ and $e_B$ are the public keys of Alice and Bob and are $e_A=g_2^{d_A}$ and $e_B=g_2^{d_B}$. Herein, the superscripts denote a power. The public keys are generated and transmitted to a corresponding mobile device by the key distribution center. The public keys are distributed to other base stations and all mobile devices within a group.

$t_A$ and $t_B$ are the prearranged withdrawal times of Alice and Bob. When a current time has reached to $t_A$, Alice is not a member of the group any longer, and when a current time has reached to $t_B$, Bob is not a member of the group any longer. The prearranged withdrawal time is set when a mobile device subscribes to a group, and is permitted to be known to the key distribution center, the base station, and all mobile devices within the group.

$\alpha$ and $\beta$ are given as random fixed integers and used to generate a verification key and a help value. $\alpha$ and $\beta$ are known only to the key distribution center and is not permitted to be known to other base stations and other mobile devices. be. In this case, $\gcd(\alpha, p-1)=\gcd(\beta, p-1)=1$ should be satisfied. When $\gcd(\alpha, p-1) \neq 1$, an integer $\alpha'$ satisfying $\alpha \neq \alpha'$ and $g_2^\alpha=g_2^{\alpha'}$ exists. In actually, there are additional integers $\alpha'$ satisfying $g_2^\alpha=g_2^{\alpha'}$, the number of which is $\gcd(\alpha, p-1)-1$. $g_2^\alpha$ is a public value, but $\alpha$ is a private value known only to Alice. As described above, since the number of values used as $\alpha$ is $\gcd(\alpha, p-1)$, a probability of finding $\alpha$ from $g_2^\alpha$ increases from $$\frac{1}{p-1}$$

to $$\frac{\gcd(\alpha, p-1)}{p-1}.$$

That is, since security of α is reduced $$\frac{1}{gcd(\alpha, p-1)}$$

times, gcd(α, p−1)=1 should be satisfied.

$C_A$ and $C_B$ are the verification keys of Alice and Bob and are $$C_A = g_1^{\frac{1}{d_A + \alpha + \beta t_A}}$$

and $$C_B = g_1^{\frac{1}{d_B + \alpha + \beta t_B}}.$$

The verification keys are used to verify the public keys and withdrawal times of Alice and Bob. When a mobile device subscribes to a group, the key distribution center generates the verification key and transmits the verification key to the mobile device. The verification key is generated only by the key distribution center. The verification key is permitted to be known to all mobile devices within the group.

$x = g_2^{\alpha}$ and $y = g_2^{\beta}$ are help values. Herein, the superscripts denote a power and are used to verify the public key, withdrawal time and verification key of a mobile device. The help value is generated by the key distribution center. Since others than the key distribution center do not know α and β, other mobile devices may not generate the help value. The help value is transmitted to the key distribution center, the base station and all mobile devices subscribing to a group and is permitted to be known to any one.

In addition, when $g'_2$, α' and β having different values are given in another group, a probability that $g_2^{'\alpha'}$ and $g_2^{'\beta'}$ having the same value are obtained is described below. $g_2^{'\alpha'}$ may have any one value from 1 to p−1 and, in order for the value thereof to be identical to that of $g_2^{\alpha}$, one of p−1 cases should be satisfied. Therefore, since the probability that x having the same value is obtained is $$\frac{1}{p-1}$$

and p is a very large prime number, a security problem hardly occurs. In addition, the same manner is applied to y.

GK is a Group Key and is used to encrypt data. When the organization of mobile devices in a group is changed, the GK is updated.

$ver_{gk,A}$ and $ver_{gk,B}$ are the versions of group keys of Alice and Bob, and the values thereof may be integers or real numbers. As the GK is updated, the version increases. That is, as the number is larger, the version is later. The versions are permitted to be known to the key distribution center, the base station, and the all mobile devices within a group.

A Bilinear Map according to the present invention will be described below.

When a function e: $G_1 \times G_2 \rightarrow G_T$ satisfies the following three conditions, e is called a bilinear map.

1) $g_1$ and $g_2$ are generators of $G_1$ and $G_2$ respectively.
2) There is isomorphism ψ: $G_2 \rightarrow G_1$, and $\psi(g_2)=g_1$.
3) When $e(g_1, g_2) \neq 1$, $e(u^a, v^b) = e(u,v)^{ab}$ is satisfied with respect to random $u \in G_1$ and $u \in G_2$, a,b∈Z. Herein, the superscripts denote a power and Z is a set of all integers.

The bilinear map is used to verify various values (public key, withdrawal time, verification key).

Isomorphism ψ is permitted with respect to a random one-to-one correspondence. In addition, a product of e(u, v) and a×b should be identical to $e(u^a, v^b)$. The operation principle will be described below.

First, an oval curve E (for example, $y^2 = x^3 + x$) is prepared, and elements $G_1$ and $G_2$ are matched to lattice points (in which coordinates of x and y are all integers) on E. With respect to random s∈$G_1$ and t∈$G_2$, e(s,t) is calculated by matching s and t to points A and B on E respectively and performing predetermined calculation using coordinates of points A and B as input values. As a result of calculation, the product of e(u,v) and a×b becomes identical to $e(u^a, v^b)$.

In the following description, Alice and Bob are used to refer to arbitrary mobile devices.

Figure 2:
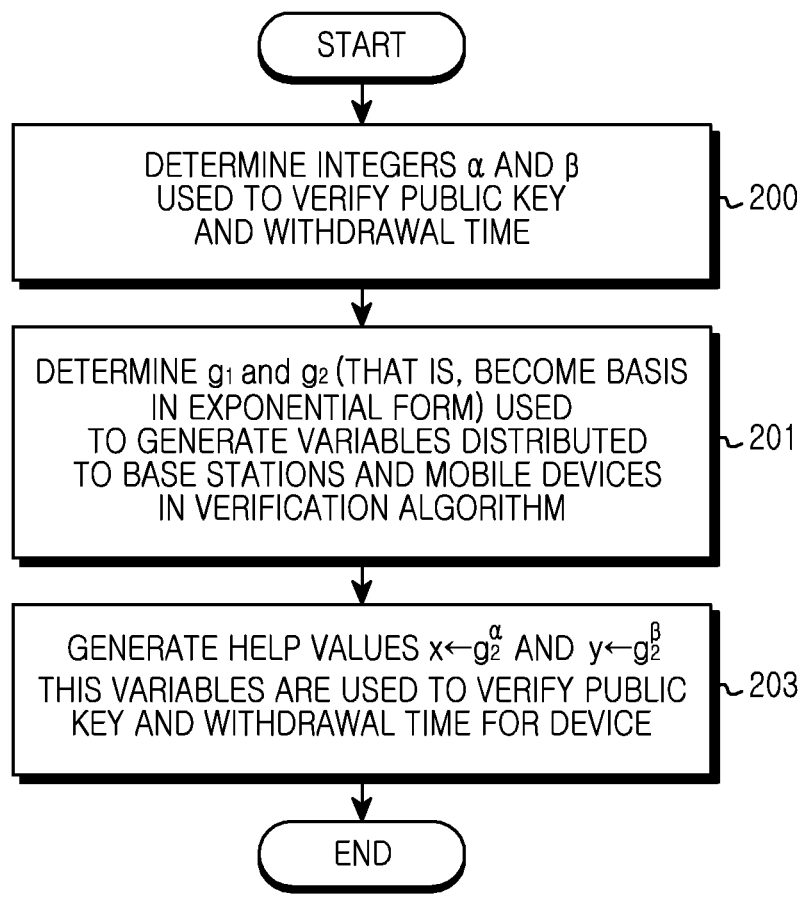
FIG. 2 is a flowchart illustrating a process of setting a key in a key distribution center according to an embodiment of the present invention.

FIG. 2 is a flowchart illustrating a process of setting up a key in a key distribution center according to an embodiment of the present invention.

Referring to FIG. 2, the process of setting up a key is a process of defining various keys in the key distribution center.

First, it is assumed that there are given a prime number p, groups $G_1$, $G_2$ and $G_T$, and an one-to-one correspondence function ψ: $G_2 \rightarrow G_1$. The key distribution center performs the following steps.

In step 200, the key distribution center determines integers α and β used to verify a public key and a withdrawal time. The α and β are private values that are known only to the key distribution center and are not permitted to be known to other mobile devices or base stations, and are invariant values. In addition, α and β should be relatively prime to p−1 and be not 1.

That is, gcd(α, p−1)≠1 or gcd(β, p−1)≠1 should be satisfied. In the case of gcd(α, p−1)≠1, there is an integer α' satisfying α≠α' and $g_2^{\alpha} = g_2^{\alpha'}$. In actual, there are additional α' satisfying $g_2^{\alpha} = g_2^{\alpha'}$, the number of which is gcd(α, p−1)−1. $g_2^{\alpha}$ is a public value, but α is a private value that is known only to the key distribution center. Since the number of values that are usable as α is gcd(α, p−1), a probability of finding α from $g_2^{\alpha}$ increases from $$\frac{1}{p-1}$$

to $$\frac{gcd(\alpha, p-1)}{p-1}.$$

That is, since security of α is reduced $$\frac{1}{gcd(\alpha, p-1)}$$

times, gcd(α, p−1)=1 should be satisfied. For the same reason, gcd(β, p−1)=1 should be satisfied.

In addition, since $g_2 = g_2^{\alpha}$ and $g_2 = g_2^{\beta}$ are given in the case of α=1 or β=1, α and β may be easily estimated. The two values should not be known to other base stations and mobile devices rather than the key distribution center.

Thereafter, the key distribution center determines $g_1$ and $g_2$ which are used to generate variables transmitted to all base stations and mobile devices in a verification algorithm (step 201). The $g_1$ and $g_2$ are random natural numbers which are smaller than p. In addition, the $g_1$ and $g_2$ should not be 1 and be relatively prime to p−1.

In other words, $g_1 \epsilon G_1$ and $g^2 \epsilon G_2$ satisfying $g_1 = \psi(g_2)$ are randomly selected. These values are the basis of a power when variables used for the present invention are generated and are invariant permanently. In addition, these values are public values distributed to other base stations and all mobile devices.

However, the $g_1$ and $g_2$ should be $gcd(\alpha, p-1) \ne 1$ or $gcd(\beta, p-1) \ne 1$. Herein, the generators should be relatively prime to p−1. The reason for this is that $g_1^0, g_1^0, g_1^0, \ldots, g_1^{p-1}$ should be different from each other, and $g_2^0, g_2^0, g_2^0, \ldots, g_2^{p-1}$ should be also different from each other. In this case, the superscripts denote a power. When the generator is not relatively prime to p−1, the values identical to each other exist among p numbers and the private key and the public key may correspond to each other according to 1:n mapping. When $g_1=1$ or $g_2=1$, other public key, help value, or verification key all have a value of 1.

Thereafter, the key distribution center generates the help values $x=g_2^\alpha$ and $x=g_2^\beta$ (step 203). The help value is used to verify the public key and withdrawal time of a device. The x and y are invariant values, and are transmitted to other base stations and mobile devices.

Figure 3:
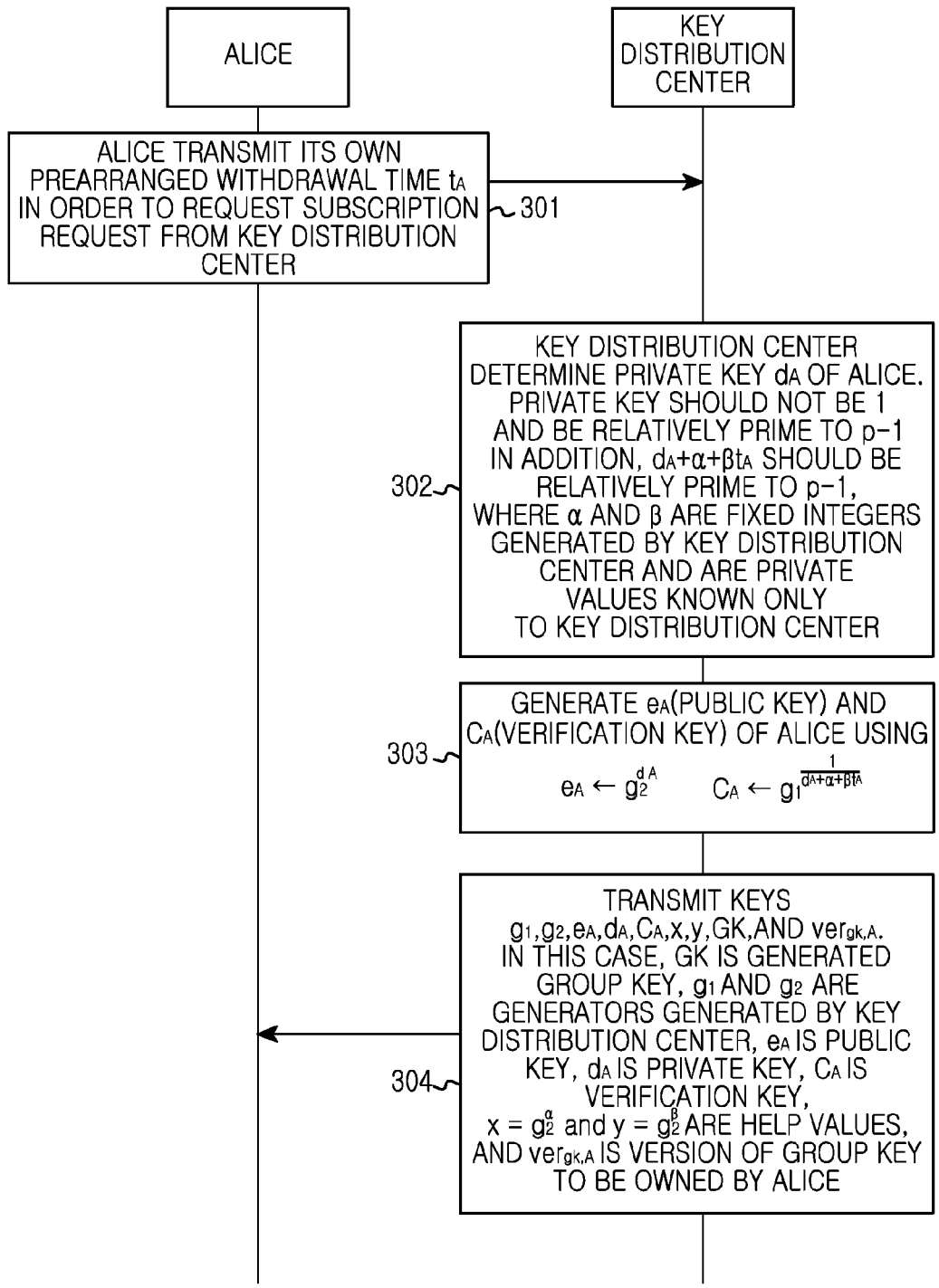
FIG. 3 is a flowchart illustrating a process of subscribing to a group in a mobile device according to an embodiment of the present invention.

FIG. 3 is a flowchart illustrating a process of subscribing to a group in a mobile device according to an embodiment of the present invention.

Referring to FIG. 3, when Alice requests subscription to a group from the key distribution center, Alice transmits its own withdrawal time $t_A$ to the key distribution center (step 301).

Thereafter, the key distribution center determines a private key $d_A$ of Alice (step 302). The private key should not be 1, and be relatively prime to p−1. The reason why the value $d_A$ should not be 1 and be relatively prime to p−1 will be described below.

That is, when $gcd(d_A, p-1) \ne 1$, an integer $d'_A$ satisfying $d_A \ne d'_A$ and $g_2^{d_A} = g_2^{d'_A}$ exists. In actually, there are additional integers $d'_A$ satisfying $g_2^{d_A} = g_2^{d'_A}$, the number of which is $gcd(d_A, p-1)-1$. $g_2^{d_A}$ is a public value but $d_A$ is a private value known only to Alice and the key distribution center. As described above, since the number of values that are usable as $d_A$ is $gcd(d_A, p-1)$, a probability of finding $d_A$ from $g_2^{d_A}$ increases from $$\frac{1}{p-1}$$

to $$\frac{gcd(d_A, p-1)}{p-1}.$$

That is, since security of $d_A$ is reduced $$\frac{1}{gcd(d_A, p-1)}$$

times, $gcd(d_A, p-1)=1$ should be satisfied. In addition, $g^2 \epsilon G_2$ is a generator and is a fixed integer which is generated by the key distribution center and shared with all mobile devices with a group and a base station.

On the other hand, $d_A+\alpha+\beta t_A$ should satisfy a condition that $d_A+\alpha+\beta t_A$ is relatively prime to p−1 in a verification key. In this case, $\alpha$ and $\beta$ are fixed integers generated by the key distribution center, and is permitted to be known only to the key distribution center and is not permitted to be known to Alice and other mobile devices.

In addition, when $gcd(d_A+\alpha+\beta t_A, p-1) \ne 1$, $$g_1^{\frac{1}{d_A+\alpha+\beta t_A}}$$

may not be calculated. That is, only when $d_A+\alpha+\beta t_A$ is relatively prime to p−1, a verification key $$C_A = g_1^{\frac{1}{d_A+\alpha+\beta t_A}}$$

may be calculated.

In this case, $\alpha$ and $\beta$ are random fixed integers, and are values used to calculate the verification key and the help values. $\alpha$ and $\beta$ are generated by the key distribution center and are known only to the key distribution center.

Thereafter, the key distribution center generates the public key $e_A$ and the verification key $C_A$ using the above equation (step 303). The public key is generated by the key distribution center and distributed to Alice. The public key is distributed to all base stations and all mobile devices within the group.

$$e_A = g_2^{d_A}, \quad C_A = g_1^{\frac{1}{d_A+\alpha+\beta t_A}} \qquad (1)$$

The verification key is used to verify whether a mobile device belongs to the same group as a counterpart mobile device, and is a value generated by the key distribution center and transmitted to the mobile device (Alice). $C_A$ is a value which may be known to all base stations and mobile devices within the group.

In an environment where Alice and Bob communicate with each other like the present embodiment, $C_A$ generated by Alice is used to verify $e_A$ and $t_A$ of Alice by the counterpart mobile device.

Thereafter, the key distribution center transmits keys $g_1$, $g_2$, $d_A$, $e_A$, $C_A$, x and y to Alice (step 304).

In this case, $e_A$ is the public key of Alice which is generated by the key distribution center and transmitted to Alice, and is known to base stations and mobile devices within the group. $C_A$ is a verification key and $x=g_2^\alpha$ and $y=g_2^\beta$ are help values and are used to verify a public key and a withdrawal time using the verification key. In addition, since the help values are generated by the key distribution center and other devices do not know $\alpha$ and $\beta$, the other devices may not generate the help values. Furthermore, the help values are known to the key distribution center, the base station and all mobile devices subscribing to a group and are invariant in any cases. $ver_{gk,A}$ is a version value of a group key to be owned by Alice. A private key $d_A$ for Alice is included in keys transmitted to Alice.

A process of updating a group key according to the present invention will be described below.

An existing method of updating a group key is for a mobile device to receive a group key that is directly updated by a key distribution center or a base station. However, there is a case where the mobile device is located outside the coverage of the key distribution center or the base station. In this case, the mobile device may not receive the group key when the group key is updated.

According to the present invention, the mobile device may receive the group key not only from the base station but from other devices within the same group as the mobile device. In this process, there is suggested an algorithm where a device that provides a group key verifies a public key or a withdrawal time of a device that receives the group key by itself without communication with the base station and the key distribution center.

The group key is updated by the key distribution center, and the updated group key generated by the key distribution center is delivered to respective base stations. The updated group key delivered to the base stations are transmitted to mobile devices within the communication coverage of the respective base stations.

In addition, the mobile devices that had not been within the communication coverage when the group key is updated may move near the base station and then receive the updated group key, or receive the updated group key from another mobile device.

When the key distribution center transmits the group key to the base station, the group key is generally transmitted through a wired network (backhaul network). Therefore, the group key is encrypted according to a known encryption method and the encrypted group key is transmitted.

Figure 4:
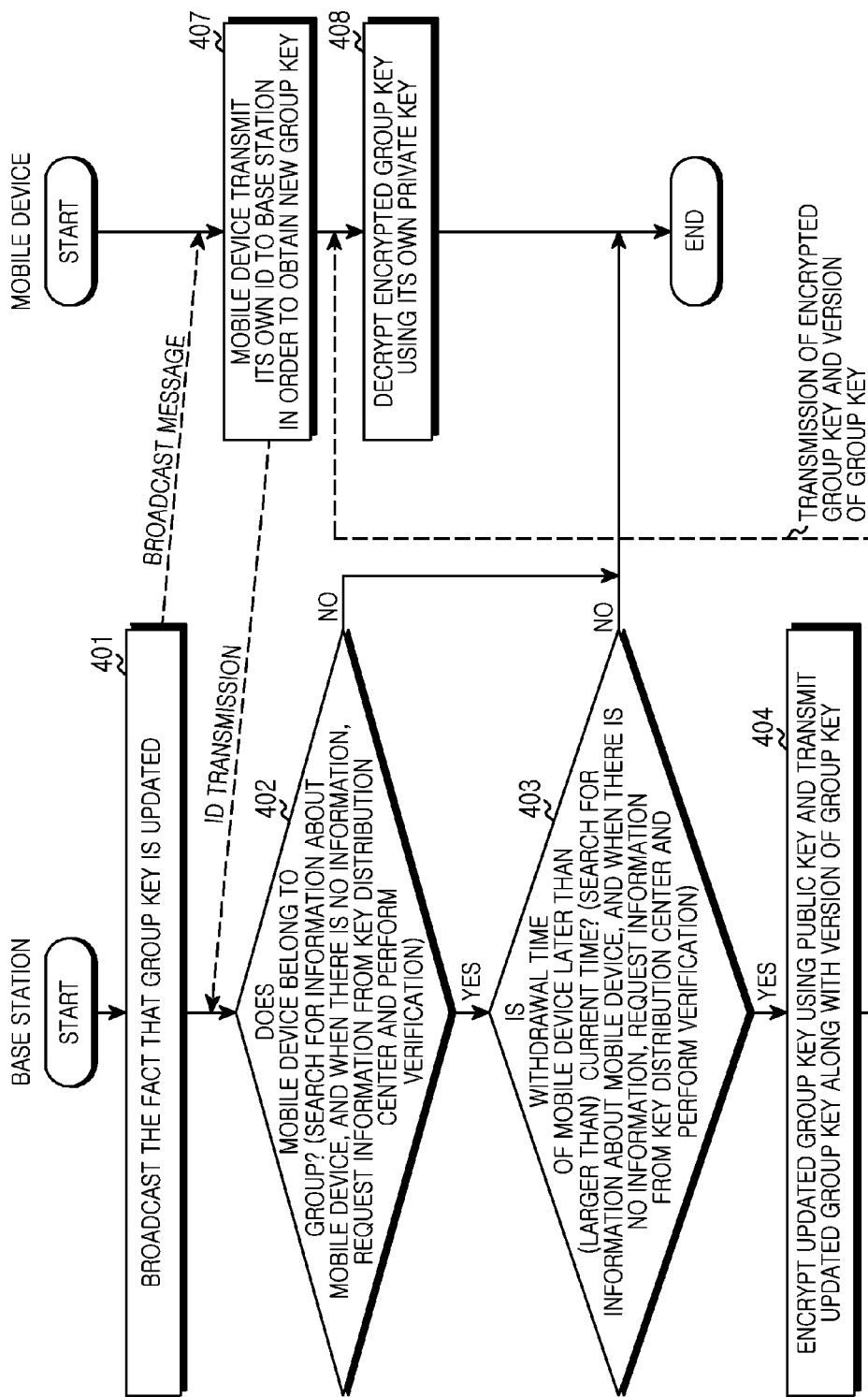
FIG. 4 is a first flowchart illustrating a process of transmitting a group key to a mobile device in a base station according to the present invention.

FIG. 4 is a first flowchart illustrating a process of transmitting a group key to a mobile device in a base station according to the present invention.

Referring to FIG. 4, there is illustrated a case where the mobile device receives the group key when the group key is updated.

In step 401, the base station broadcasts a message including information about updating of the group key.

In step 407, the mobile device transmits its own ID to the base station at the time of requesting an updated group key.

In steps 402 and 403, the base station determines whether the mobile device belongs to a group or the withdrawal time of the mobile device has been reached.

Although not illustrated in FIG. 4, when the base station does not have information about the mobile device, the base station requests and receives the information from the key distribution center.

When the mobile device belongs to the group and the withdrawal time of the mobile device has not been reached (steps 402 and 403), the base station encrypts the updated group key by using a public key corresponding to the mobile device and unitcasts the encrypted group key along with the version of the group key to the mobile device for transmission in step 404.

The mobile device receives the encrypted group key and the version of the group key and decrypts the updated group key by using a private key in step 408.

Figure 5:
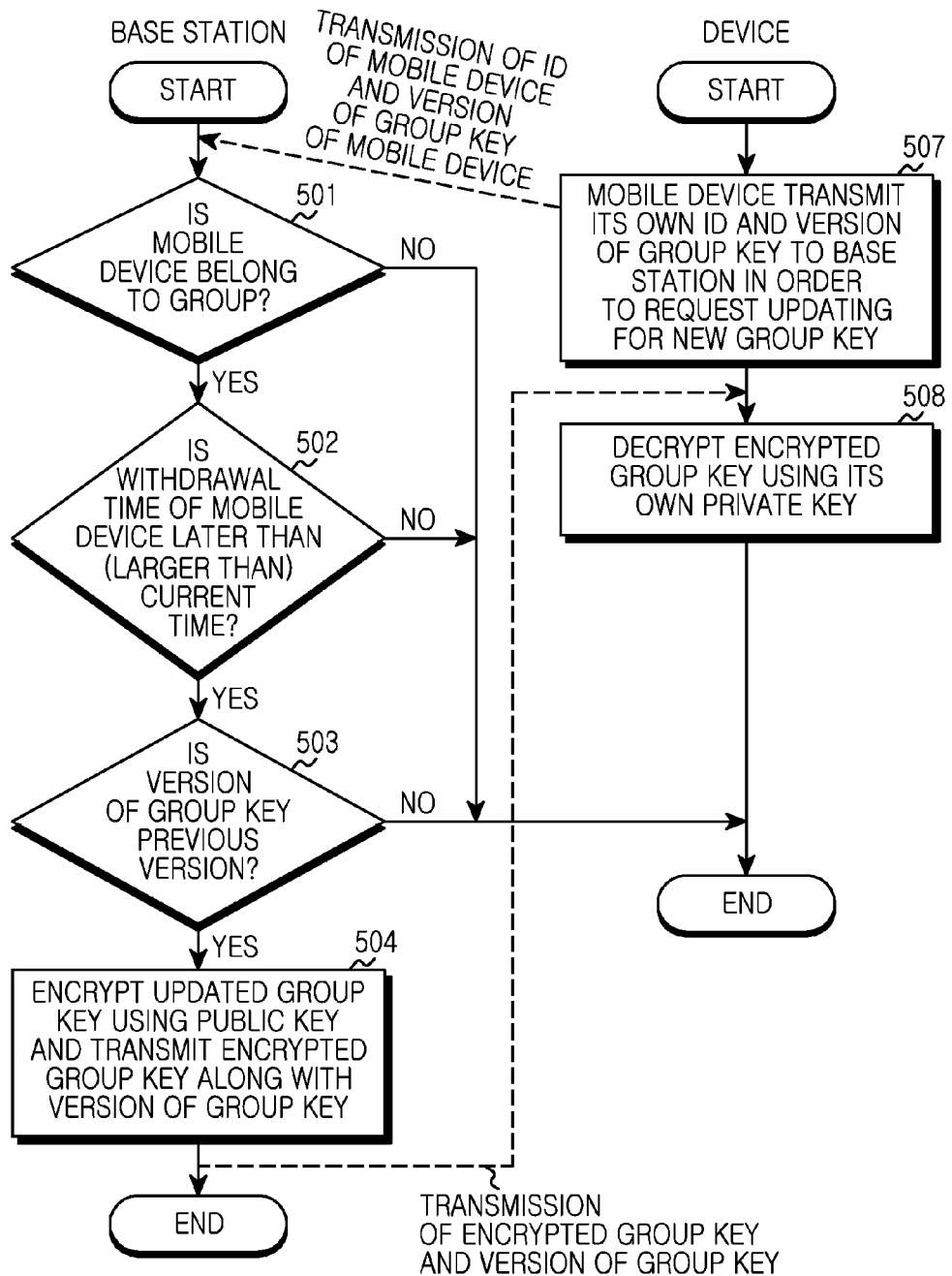
FIG. 5 is a second flowchart illustrating a process of transmitting a group key to a mobile device in a base station according to the present invention.

FIG. 5 is a second flowchart illustrating a process of transmitting a group key to a mobile device in a base station according to the present invention.

Referring to FIG. 5, there is illustrated a case where the mobile device requests the base station to update the group key additionally after updating of the group key. That is, the above case is a case where the mobile device that has not received the group key when the group key is updated receives the group key from the base station later.

In step 507, the mobile device transmits its own ID and the group key's version when the mobile device requests updating of the group key.

In steps 501 and 502, the base station determines whether the mobile device belongs to a group or the withdrawal time of the mobile device has been reached.

When the mobile device belongs to the group, the withdrawal time of the mobile device has not been reached (steps 501 and 502), and the group key is not of a previous version (step 503), the base station encrypts the updated group key by using a public key corresponding to the mobile device and transmits the encrypted group key along with the version of the group key to the mobile device in step 504.

The mobile device receives the encrypted group key and the version of the group key and decrypts the updated group key by using its own private key in step 508.

As shown in FIGS. 4 and 5, the base station verifies whether the mobile device belongs to a group and a withdrawal time. An attacker may cheat on and transmit his or her ID in order to obtain the group key illegally.

When the attacker transmits an appropriate user's ID not her or his own ID, verification will be successful and an encrypted group key will be received. However, since the encrypted key is what is encrypted using the public key of the appropriate user rather than the public key of the attacker and the attacker does not know the private key, the attacker may not decrypt the encrypted key. That is, the attacker may not obtain the group key.

A process for group key transmission between mobile devices will be described below. The process for group key transmission is divided into two parts. The two parts are a step of verifying whether a counterpart mobile device belongs to a group and a step of transmitting a group key actually.

Figure 6A:
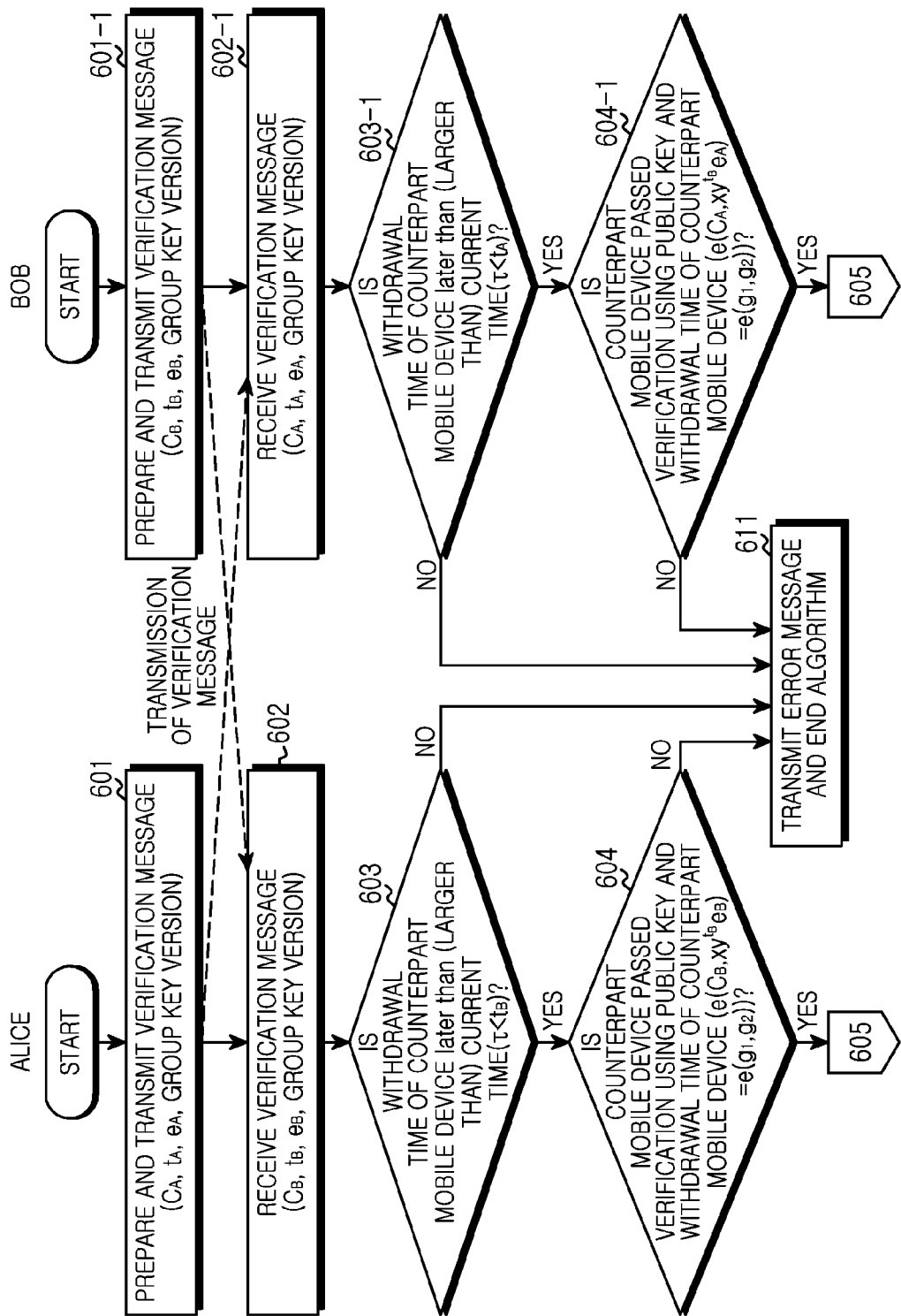
FIGS. 6A and 6B are flowcharts illustrating a process of transmitting a group key between mobile devices according to an embodiment of the present invention.
Figure 6B:
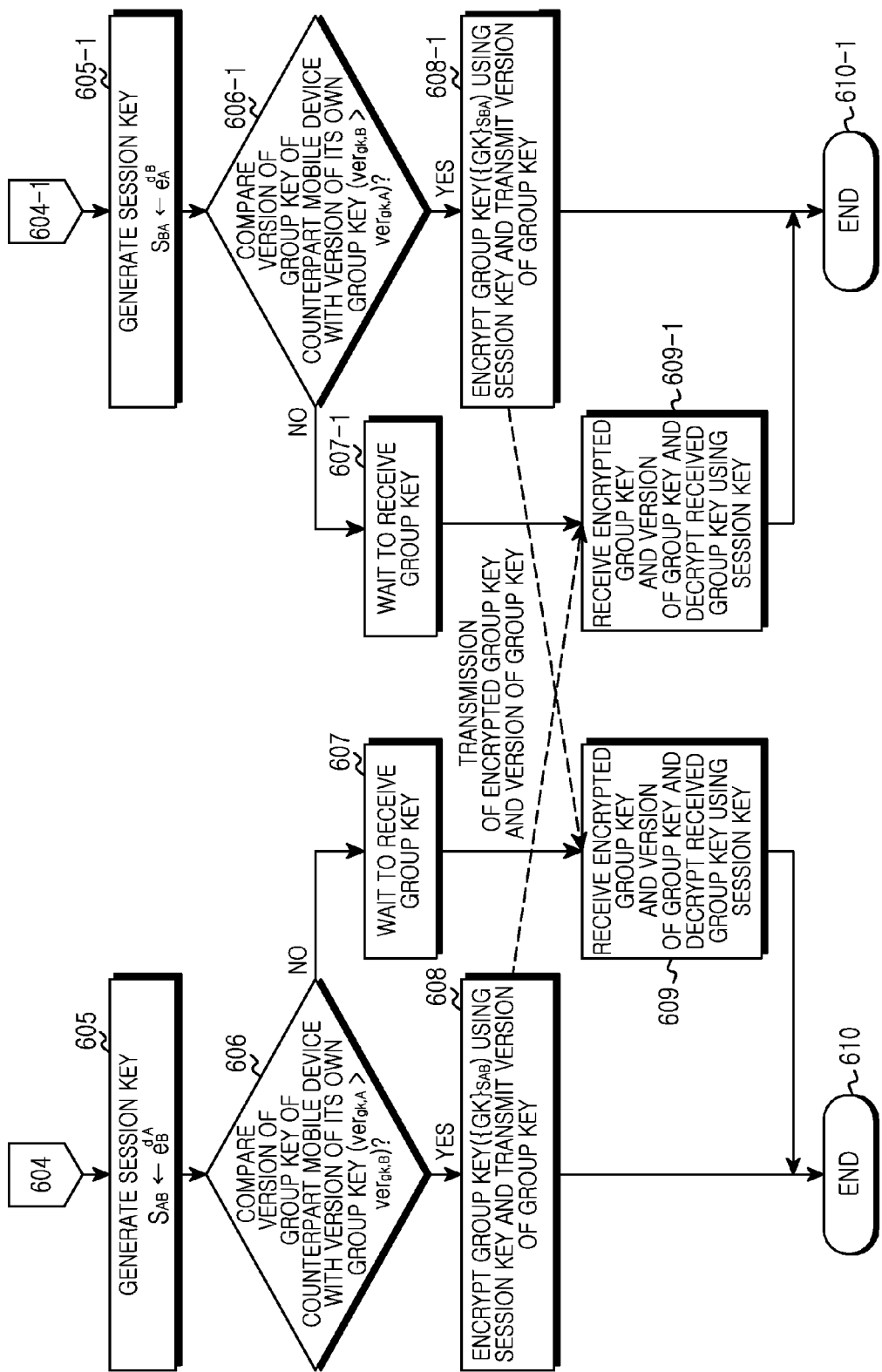

FIGS. 6A and 6B are flowcharts illustrating a process of transmitting a group key between mobile devices according to an embodiment of the present invention.

Referring to FIGS. 6A and 6B, two devices participating in exchange of the group key are named Alice and Bob. It is assumed that Alice has the later group key than that of Bob, and Alice transmits the group key to Bob.

When Alice and Bob are within communicable coverage of each other, Alice and Bob respectively transmit theirs verification messages $C_A\|t_A\|e_A\|ver_{gk,A}$ and $C_B\|t_B\|e_B\|ver_{gk,B}$ to each other (steps 601 and 601-1).

In this case, in order for Alice and Bob to verify each other, Alice transmits Alice's verification key $C_A$, public key $e_A$, withdrawal time $t_A$, and group key version $ver_{gk,A}$ to Bob, and Bob transmits Bob's verification key $C_B$, public key $e_B$, withdrawal time $t_B$, and group key version $ver_{gk,B}$ to Alice. In this case, $C_A$ is the verification key of Alice and is used to verify the public key $e_A$, and withdrawal time $t_A$ of Alice. $C_A$ is generated by the key distribution center and is transmitted to a corresponding mobile device. The $C_A$ may be known to a base station and mobile devices which belong to a group.

Thereafter, Alice and Bob receive the verification messages respectively from each other (steps 602 and 602-1).

Alice and Bob verify whether the withdrawal time is later than a current time (whether the value of the withdrawal time is larger than the current time) (steps 603 and 603-1).

When the withdrawal time is later than the current time, that is, the withdrawal time is larger than the current time (later in time), it is indicated that Alice and Bob belong to a group as members of the group.

When the current time is later than the withdrawal time, a relevant user transmits an error message and ends the present algorithm (step 611).

When the current time is earlier than the withdrawal time, Alice and Bob verify the validity of the verification message transmitted from the counterpart (steps 604 and 604-1). In this case, a method of verifying the verification message is to verify whether $e(C_B, xy^{t_B}e_B)=e(g_1, g_2)$ is established from the point of view of Alice or whether $e(C_A, xy^{t_A}e_A)=e(g_1, g_2)$ is established in the point of view of Bob. When the relationship is not established, it represents that the public key is not what is owned by the counterpart, or the withdrawal time is forged.

Herein, $g_1$ and $g_2$ are generators which are generated by the key distribution center and are integers which are received by Alice when Alice subscribes to the group. In addition, x and y are $x=g_2^\alpha$ and $x=g_2^\beta$ as help values. The help values are generated by the key distribution center and provided when a corresponding mobile device subscribes to the group and are used to verify the public key and withdrawal time of the mobile device using the verification key. $e^B$ is the public key of Bob, and $e^A$ is the public key of Alice.

When the verification is not successful, the relevant user transmits an error message and ends the present algorithm (step 611).

Thereafter, Alice and Bob generate a session key respectively (steps 605 and 605-1). Alice and Bob generate the session key used to encrypt a group key. The session key may be calculated by raising the public key received from the counterpart to the power of its own private key. That is, Alice generates $S_{AB} \leftarrow e_B^{d_A}((g_2^{d_B})^{d_A})$, and Bob generates $S_{BA} \leftarrow e_A^{d_B}((g_2^{d_A})^{d_B})$. The session key is used to encrypt the group key.

Thereafter, Alice and Bob determine which group key is of a latest version (steps 606 and 606-1) among the counterpart's group key and its own group key. In this case, a user having the group key of a latest version becomes a transmitter, and a user having the group key of the latest version becomes a receiver.

The transmitter encrypts the group key using the session key and transmits the encrypted group key along with the version of the group key (steps 608 and 608-1). The receiver waits to receive and receives the group key encrypted using the session key and the version of the group key (steps 607 and 607-1) and decrypts the group key encrypted using the session key (steps 609 and 609-1). In this case, the session keys generated by Alice and Bob are identical to each other (step 608).

It is assumed that Alice is the transmitter and Bob is the receiver. In this case, Alice encrypts the group key using the session key and transmits the encrypted group key along with the group key's version (step 608).

Thereafter, Bob waits to receive the group key encrypted using the session key and the group key's version (step 607-1), and when receiving the group key and the group key's version, decrypts the group key using the session key generated by itself (step 609-1).

In FIG. 6, in key exchange between mobile devices, accuracy of verification is expressed by Equation (2). The verification is established through Equation (2).

$$e(C_B, xy^{t_B}e_B) = e\left(g_1^{\frac{1}{d_B+\alpha+\beta t_B}}, g_2^\alpha \cdot g_2^{\beta t_B} \cdot g_2^{d_B}\right) \quad (2)$$

$$= e\left(g_1^{\frac{1}{d_B+\alpha+\beta t_B}}, g_2^\alpha \cdot g_2^{\beta t_B} \cdot g_2^{d_B}\right)$$

$$= e\left(g_1^{\frac{1}{d_B+\alpha+\beta t_B}}, g_2^{\alpha+\beta t_B+d_B}\right)$$

$$= e(g_1, g_2)^{\frac{1}{d_B+\alpha+\beta t_B}(\alpha+\beta t_B+d_B)}$$

$$= e(g_1, g_2)$$

According to the same method, $e(C_A, xy^{t_B}e_B)=e(g_1,g_2)$ may be known. That is, when Alice and Bob are normal users, Alice and Bob may verify a counterpart respectively by verifying Equation (2).

Security respect to key exchange between mobile devices will be described below.

Since it is required that a prearranged withdrawal time is later the current time in order for reception of the group key, the attacker cheats the prearranged withdrawal time in order to obtain the group key illegally.

In order for Bob to cheat on the prearranged withdrawal time, Bob may use a method for changing $t_B$ or receiving $C_T \| t_T \| e_T$ (may be obtained in group key exchange with Trudy) from another user (for example, also referred to as Trudy) and using the verification message of Trudy. For the respective cases, safety for the proposed algorithm will be described below.

First, a case where $t_s$ is only forged will be described below.

First, $C_B$ may not be forged.

A strong Diffie-Hellman Problem is that when there are two multiplicative groups $G_1$ and $G_2$ and isomorphism $\psi: G_2 \to G_1$, and inputs are given, such as $g_1, g_2, g_2^\gamma, g_2^{\gamma^2}, g_2^{\gamma^3}, \ldots, g_2^{\gamma^k}$ with respect to $g_1 \in G_1$ and $g_1 \in G_1$ satisfying $\psi(g_2)=g_1$, outputs x and $g_2^{1/\gamma+x}$ are induced in a state in which $\gamma$ is not known. In this case, $\gamma$ is a given integer, and x is a random integer. In $g_2^{\gamma^k}$, $\gamma^k$ is the power k of $\gamma$, and $g_2^{\gamma^k}$, $g_2$ is the power $\gamma^k$ of $g_2$.

The Strong Diffie-Hellman Problem is known to be very difficult to be solved. That is, in a state where the attacker does not know $\alpha$ and $\beta$, it is very difficult to induce $x_s$, $t_s$ and $$g_2^{\frac{1}{\alpha+x+\beta t_B}}.$$

In addition, verification is failed in step 604 of FIG. 6. Accordingly, when $C_B$ is not changed, $e_s=g_2^{d_B}$ should be forged. When $d_B$ is changed to $d'_B$ in a case where $t_B$ is forged to be $t'_B$, $d_B+\alpha+\beta t_B=d'_B+\alpha+\beta t'_B$ should be satisfied in order for success in verification.

However, since $\beta$ is known only to the key distribution center but is not known to Bob, $d'_B$ may not be calculated. A method of changing only $t_S$ is impossible.

A case of forging a verification message entirely and using the verification message $(C_T, t_T, e_T)$ of another user will be described below.

First, the verification message of another user may pass a verification procedure when the other user belongs to the group. Thereafter, Alice generates $S_{AB}=e_T^{d_A}=g_2^{d_A d_T}$ in step 604 of FIG. 6, and encrypts the group key with $g_2^{d_A d_T}$ in step 608.

Then, Bob requires $d_A$ to generate the same session key in step 605-1. Since $d_A$ is known only to Alice and is not known to Bob, Bob may not generate $g_2^{d_A d_T}$.

That is, Bob receives an encrypted and updated group key. However, since Bob is not able to decrypt a password, Bob may not obtain the updated group key.

Figure 7:
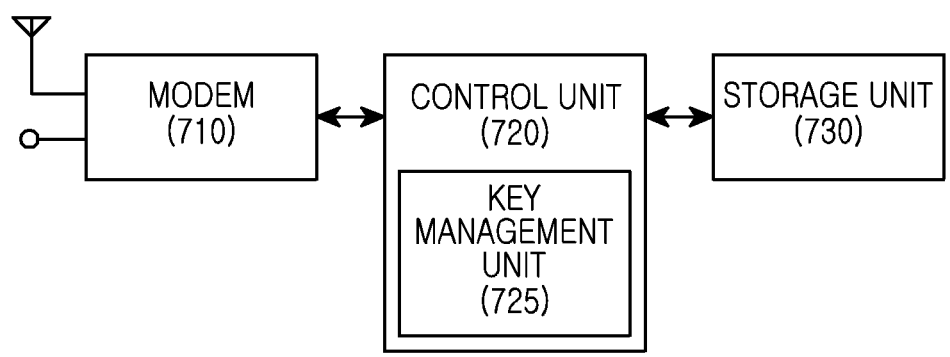
FIG. 7 is a diagram illustrating an apparatus including a block configuration of a mobile device, a base station, and a key distribution center according to an embodiment of the present invention.

FIG. 7 is a diagram illustrating an apparatus including a block configuration of a mobile device, a base station, and a key distribution center according to an embodiment of the present invention.

Referring to FIG. 7, the apparatus includes a modem 710, a control unit 720, a storage unit 730, and a key management unit 725. The control unit 720 may control or include the key management unit 725.

The modem 710 is a module for communicating with other apparatuses and includes a RF processing unit and a baseband processing unit. The RF processing unit converts a signal received through an antenna into a baseband signal, and provides the baseband signal to the baseband processing unit. In addition, the RF processing unit converts the baseband signal from the baseband processing unit into an RF signal that is transmittable on an actual wireless path, and transmits the RF signal through the antenna.

In addition, the modem 710 may include a wired modem for wired communication (backhaul communication) in the case of the base station and the key distribution center. The wired modem includes a wired processing unit and a baseband processing unit. The wired processing unit converts a signal received through a wired path to a baseband signal to provide the baseband signal to the baseband processing unit. In addition, the wired processing unit converts a baseband signal from the baseband processing unit to a wired signal that is transmittable on an actual wired path, and transmits the wired signal through the wired path.

The control unit 720 controls the overall operation of the apparatus, and in particular, controls the key management unit 725 according to the present invention.

The storage unit 730 stores a program for controlling overall operation of the apparatus and temporal data generated during program execution.

First, as to the mobile device, the key management unit 725 provides information about a withdrawal time to the key distribution center when subscription to a group is requested and receives a plurality of keys from the key distribution center. For example, when it is assumed that the mobile device is Alice's device, the key management unit 725 receives keys $g_1$, $g_2$, $e_A$, $d_A$, $C_A$, x, y, $G_K$, or $ver_{gk,A}$ from the key distribution center.

In addition, the key management unit 725 transmits its own ID to the base station and receives a group key in response thereto when a request for a group key is generated.

In addition, the key management unit 725 transmits a verification message to another mobile device at the time of exchange of a group key with the other mobile device. Thereafter, the key management unit 725 verifies the validity of the verification message. When it is determined that the verification message is valid, and the version of its own group key is higher than that of the other mobile device, the key management unit 725 encrypts its own group key using a session key and transmits a result of the encryption to the other mobile device. A process of determining the validity is described in the description with reference to FIG. 6.

As to the base station, the key management unit 725 broadcasts the fact that the group key is updated when the group key has been updated. Thereafter, when the mobile device requests transmission of the group key, the key management unit 725 verifies the validity of the request. Thereafter, the key management unit 725 encrypts the group key and transmits the encrypted group key to a mobile device. In this case, the process of determining the validity is described with reference to FIGS. 4 and 5.

As to the key distribution center, when the base station or the mobile device requests a specific key, the key management unit 725 verifies the validity, and then transmits the specific key to the base station or the mobile device. Descriptions for the verification determination process and the specific key have been given with reference to FIGS. 2, 3 and 6.

According to embodiments of the present invention, communication cost involved in data transmission may be reduced by using a group key. In addition, when the group key is updated, mobile devices which had not received the group key from a base station when the group key is updated may receive the group key from the base station or another mobile device of the same group as the mobile device later.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for managing a key in a mobile device, comprising:
transmitting a first verification message to a counterpart mobile device and receiving a second verification message from the counterpart mobile device;
verifying whether the second verification message is valid;
generating a session key when the second verification message is valid;
encrypting its own group key using the session key when a version of a group key included in the second verification message is not later than a version of its own group key; and
transmitting the encrypted group key to the counterpart mobile device.

2. The method of claim 1, further comprising:
waiting to receive a group key from the counterpart mobile device when the version of the group key included in the second verification message is later than the version of the its own group key; and
decrypting the received group key of the counterpart mobile device.

3. The method of claim 1, wherein verifying whether the second verification message is valid comprises verifying whether the following Equation is established $$e(C_B, x y^t_B e_B) = e(g_1, g_2)$$

where $g_1$ and $g_2$ are generators and integers generated by a key distribution center and received when the mobile device subscribes to a group, x and y are help values $x = g_2^\alpha$ and $x = g_2^\beta$, the help values are generated by the key distribution center and provided when the mobile device subscribes to the group and used to verify a public key and a withdrawal time of the mobile device using a verification key, $e_B$ is a public key of the counterpart mobile device, $e_A$ is a public key of the mobile device, and $t_B$ is the withdrawal time of the counterpart mobile device.

4. The method of claim 3, wherein verifying whether the second verification message is valid further comprises verifying whether the withdrawal time of the counterpart mobile device included in the second verification message is later than a current time.

5. The method of claim 1, wherein encrypting the its own group key using the session key comprises using the following Equation:

$$S_{AB} \leftarrow e_{AB}^d$$

where A is the mobile device, B is the counterpart mobile device, $e_B$ is a public key of the counterpart mobile device, $d_A$ is a private key for A, and $S_{AB}$ denotes the session key.

6. The method of claim 1, further comprising transmitting an error message to the counterpart mobile device when the second verification message is not valid.

7. The method of claim 1, further comprising:
before the second verification message is received from the counterpart mobile device after the first verification message is transmitted to the counterpart mobile device, transmitting a key request from the key distribution center; and
receiving at least one key from the key distribution center.

8. The method of claim 7, wherein the key request includes the withdrawal time of the mobile device.

9. The method of claim 7, wherein the at least one key is at least one of $g_1$, $g_2$, $e_A$, $C_A$, x, y, GK, $ver_{gk,A}$, and $d_A$, where $e_A$ is a public key of a mobile device A, $C_A$ is a verification key for the mobile device A, $x=g_2^\alpha$ and $x=g_2^\beta$ are help values, $ver_{gk,A}$ is a version value of a group key to be owned by the mobile device A, $g_1$ and $g_2$ are generators, $d_A$ is a private key for the mobile device A, and GK is a group key.

10. A mobile device apparatus for managing a key, comprising:
a control unit for generating a first verification message to be transmitted to a counterpart mobile device, verifying whether a second verification message received from the counterpart mobile device is valid, generating a session key when the second verification message is valid, and encrypting its own group key using the session key when a version of a group key included in the second verification message is not later than a version of its own group key; and
a modem for transmitting the first verification message to the counterpart mobile device, receiving the second verification message from the counterpart mobile device and transmitting the encrypted group key to the counterpart mobile device.

11. The mobile device apparatus of claim 10, wherein the control unit waits to receive a group key from the counterpart mobile device through the modem when the version of the group key included in the second verification message is later than the version of the its own group key and decrypts the received group key of the counterpart mobile device.

12. The mobile device apparatus of claim 10, wherein the control unit verifies whether the following Equation is established when whether the second verification message is valid is verified $$e(C_B, xy'_B e_B) = e(g_1, g_2)$$

where $g_1$ and $g_2$ are generators and integers generated by a key distribution center and received when the mobile device subscribes to a group, x and y are help values $x=g_2^\alpha$ and $x=g_2^\beta$ the help values are generated by the key distribution center and provided when the mobile device subscribes to the group and used to verify a public key and a withdrawal time of the mobile device using a verification key, $e_B$ is a public key of the counterpart mobile device, $e_A$ is a public key of the mobile device, and $t_B$ is the withdrawal time of the counterpart mobile device.

13. The mobile device apparatus of claim 12, wherein the control unit verifies whether the withdrawal time of the counterpart mobile device included in the second verification message is later than a current time when whether the second verification message is valid is verified.

14. The mobile device apparatus of claim 10, wherein the control unit uses the following Equation when the its own group key is encrypted using the session key $$S_{AB} \leftarrow e_{AB}^d$$

where A is the mobile device, B is the counterpart mobile device, $e_B$ is a public key of the counterpart mobile device, $d_A$ is a private key for A, and $S_{AB}$ denotes the session key.

15. The mobile device apparatus of claim 10, wherein the control unit transmits an error message to the counterpart mobile device when the second verification message is not valid.

16. The mobile device apparatus of claim 10, wherein the control unit transmits a key request from the key distribution center, and receives at least one key from the key distribution center before the second verification message is received from the counterpart mobile device after the first verification message is transmitted to the counterpart mobile device.

17. The mobile device apparatus of claim 16, wherein the key request includes the withdrawal time of the mobile device.

18. The mobile device apparatus of claim 16, wherein the at least one key is at least one of $g_1$, $g_2$, $e_A$, $C_A$, x, y, GK, $ver_{gk,A}$, and $d_A$, where $e_A$ is a public key of a mobile device A, $C_A$ is a verification key for the mobile device A, $x=g_2 a$ and $x=g_2^\beta$ are help values, $ver_{gk,A}$ is a version value of a group key to be owned by the mobile device A, $g_1$ and $g_2$ are generators, $d_A$ is a private key for the mobile device A, and GK is a group key.

* * * * *